(12) United States Patent
Prakash et al.

(10) Patent No.: US 7,557,543 B2
(45) Date of Patent: *Jul. 7, 2009

(54) METHOD AND SYSTEM FOR DISCHARGING A CAPACITIVE ELEMENT

(75) Inventors: Raj Prakash, Canton, MI (US); Venkateswa A. Sankaran, Farmington Hills, MI (US); Michael W. Degner, Novi, MI (US); David C. Gabriel, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/845,254

(22) Filed: Aug. 27, 2007

(65) Prior Publication Data

US 2007/0285064 A1 Dec. 13, 2007

Related U.S. Application Data

(63) Continuation of application No. 10/605,387, filed on Sep. 26, 2003, now Pat. No. 7,268,521.

(51) Int. Cl.
*H01M 10/44* (2006.01)

(52) U.S. Cl. .................................................. 320/166
(58) Field of Classification Search ................. 320/104, 320/166, 167
See application file for complete search history.

(56) References Cited

U.S. PATENT DOCUMENTS

| | | | |
|---|---|---|---|
| 3,210,067 A | 10/1965 | Ferguson et al. | |
| 4,136,659 A | 1/1979 | Smith | |
| 4,336,587 A | 6/1982 | Boettcher, Jr. et al. | |
| 5,433,184 A | 7/1995 | Kinoshita et al. | |
| 5,619,107 A | 4/1997 | Shinohara et al. | |
| 5,844,330 A | 12/1998 | Furukawa et al. | |
| 6,002,221 A | 12/1999 | Ochiai et al. | |
| 6,281,660 B1 * | 8/2001 | Abe | 320/103 |
| 7,268,521 B1 * | 9/2007 | Prakash et al. | 320/166 |
| 2007/0026711 A1 * | 2/2007 | Chorian et al. | 439/174 |

* cited by examiner

*Primary Examiner*—Edward Tso
(74) *Attorney, Agent, or Firm*—David B. Kelley; Brooks Kushman P.C.

(57) ABSTRACT

An electric drive system having a power source which provides power to an electric motor through an electric motor control. Discharging of stored capacitor energy of a capacitor coupled between the power source and the electric motor controller is provided by controlling energy transfer from the capacitor to the electric motor.

20 Claims, 1 Drawing Sheet

METHOD AND SYSTEM FOR DISCHARGING A CAPACITIVE ELEMENT

CROSS-REFERENCE TO RELATED APPLICATION

This application is a continuation of U.S. application Ser. No. 10/605,387, filed Sep. 26, 2003, now U.S. Pat. No. 7,268,521 B1, issued on Sep. 11, 2007 which is hereby incorporated by reference.

BACKGROUND OF THE INVENTION

1. Field of the Invention

The present invention relates to electric machines and electric drive systems having a power source that provides power to an electric motor through an electric motor controller. In particular, the present invention relates to discharging a capacitor coupled between the power source and the electric motor controller.

2. Background Art

For the purposes of the present invention, electric machines and electric drive systems relate to systems which use an electric motor to drive a load. These systems can include a number of components, and typically, such systems include at least a power source, an electric motor controller, and an electric motor. In this arrangement, the electric motor controller can receive power from the power source, which the electric motor controller then controllably transfers to the electric motor for driving a load.

For DC power sources, a capacitor can be coupled between the power source and the electric motor controller to smooth the DC power output from the power source. The coupling of the capacitor to the power source causes the capacitor to become charged. The capacitor remains charged until its stored energy can be dissipated.

In the foregoing system, there exists a need to discharge this stored capacitive energy when the DC power source is disconnected. In addition, there exists a need to provide a cost effective approach to discharging the stored capacitor energy.

SUMMARY OF THE INVENTION

The present invention is a cost effective approach to discharge stored capacitor energy to meet the needs identified above. In particular, the present invention uses standard system components which can be used across different product lines without requiring substantial hardware modifications.

One aspect of the present invention relates to a system that includes a DC power source coupled to an electric motor controller, with the electric motor controller coupled to an electric motor to drive a load connected to the electric motor. A capacitor is coupled between the power source and the electric motor controller to smooth the DC output from the power source.

The system permits stored capacitor energy to be transferred from the capacitor to the electric motor with standard system components by transferring the stored capacitor energy to electric motor for dissipation. In particular, the stored capacitor energy is transferred to the electric motor by the electric motor controller controlling the current drawn from the capacitor and the voltage provided to the electric motor.

A software program controls operation of the electric motor controller to control the discharging of the stored capacitor energy. In general, the energy transfer is controlled by controlling the flux and torque produced by the electric motor through the voltage provided to the electric motor.

To discharge the stored capacitor energy, a control methodology must produce positive power flow from the capacitor to the electric motor controller. The positive power flow can be produced by the electric motor controller controlling the flux and torque produced by the electric motor such that energy can flow from the capacitor to the electric motor. Various motor torque-control and flux-control strategies and methodologies can be used with the present invention.

One aspect of the present invention utilizes a synchronously rotating d-q reference frame motor torque and flux control methodology. The d-q reference frame methodology generally relates to a simplified approach to controlling an AC electric motor, as understood by one having ordinary skill in the art. The unique feature of synchronously rotating d-q reference frame is that the motor has behavior similar to that of a DC motor. This makes it easier to control the electric motor. Moreover, the synchronously rotating d-q reference frame provides for the ability to control motor torque and motor flux independently of each other.

The d-q methodology utilizes a quadrature-axis current value (Iq) and a direct-axis current value (Id). The Iq and Id values are controlled by the voltage provided to the electric motor. By controlling the voltage provided to the electric motor based on the Iq and Id values, the torque and flux produced by the electric motor are controlled. In this manner, energy transferred to the electric motor can be controlled such that the stored capacitor energy can be discharged and dissipated in the electric motor.

The Iq and Id value calculations are dependent on the type of electric motor and the driving conditions of the electric motor. As the discharge of stored capacitor energy to the electric motor can be sufficient to produce torque in the motor, preferably, the driving conditions are monitored in some cases to prevent the torque production to the load connected to the motor.

To better understand the manner in which the Iq and Id values can be calculated, the following equation for an interior permanent magnet synchronous motor is provided as an illustrative example:

$$T=(3/2)*p*Iq*[phi+(Ld-Lq)*Id]$$

wherein:

T=torque;

p=number of stator pole-pairs;

phi=Flux-linkages (weber-turns) due to the permanent magnets;

Ld=Self-inductance of the stator along d-axis;

Lq=Self-inductance of the stator along q-axis;

Id=Motor stator current along d-axis; and

Iq=Motor stator current along q-axis.

DETAILED DESCRIPTION OF THE PREFERRED EMBODIMENTS

Figure 1:
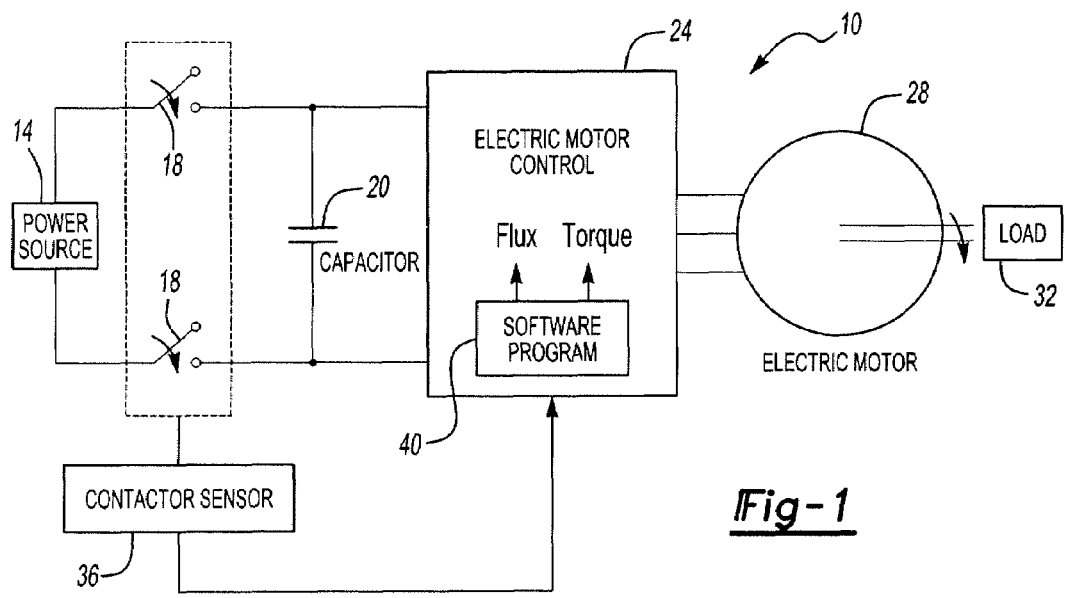
FIG. 1 illustrates an exemplary electric drive system to discharge stored capacitive energy in accordance with the present invention.

FIG. 1 illustrates an exemplary electric drive system 10. The system includes a power source 14, a pair of contactors 18, a capacitor 20, an electric motor controller 24, and an electric motor 28.

The system 10 can be used with any number of electric systems, including industrial and automotive applications for driving a load 32. For exemplary purposes, this detailed description relates to an automotive application wherein the load 32 is a vehicle driven by motor 28.

The present invention is particularly suitable for use in a series hybrid electric vehicle (SHEV), a parallel hybrid electric vehicle (PHEV), a powersplit hybrid electric vehicle (PSHEV), a fuel cell hybrid electric vehicle, and any other electrically driven vehicles which have a need to discharge stored capacitor energy through an electric motor.

The power source 14 shown is a DC power source, such as a DC battery. The power source could also be an AC power source with a rectifier, a fuel cell, or other electric energy producing or storage devices.

The contactors 18 are switches which can be used to remove or separate the power source 14 from the rest of the system. A contactor sensor 36 is provided to monitor the status of the contactors 18 i.e., whether the contactors are opened or closed. Alternatively, the electric motor controller 24 can be used to control the contactors.

As shown, the power source 14 is coupled to the rest of the system when the contactor switches 18 are closed and separated from the rest of the system when the contactor switches 18 are open. When closed, electric energy from the power source 14 passes through the contactors 18 to be smoothed by the capacitor 20 prior to reaching the electric motor controller 24.

The connection of the capacitor 20 to the power source 14 causes the capacitor 20 to become charged and to develop an electric potential. The capacitor 20 maintains its charge, at least for a period of time, even if the contactors 18 are open. As such, it can be desirable to discharge the capacitor 20. Typically, it would be desirable to discharge the capacitor 20 anytime the contactors 18 are open, however, this is an optional control.

Once it is determined that the contactors 18 are open or another event triggers a desire to discharge the stored capacitor energy, the electronic motor controller 24 controls positive power flow from the capacitor 20 to the electric motor controller 24 and the electric motor 28 to discharge the capacitor 20.

For the purposes of the present invention, positive power flow relates to the flow of energy from the capacitor to the electric motor controller 24, and preferably beyond the electric motor controller 24 to the electric motor 28. Negative power flow relates to the flow of energy from the electric motor controller 24 or the electric motor 28 to the capacitor 20, such as during regenerative braking.

The electric motor controller 24 includes a software program 40 to control discharging of the capacitor 20. The software program 40 preferably provides positive power flow from the capacitor 20 to the electric motor controller 24 and the electric motor 24. In this manner, the stored capacitor energy can be dissipated though power losses in the electric motor controller 24 and the electric motor 28, and through flux and torque production in the electric motor 28.

The positive power flow can be controlled by controlling flux and torque commands used by the electric motor controller 24 to control the electric motor 28, as one of ordinary skill in the art will appreciate. In general, stored capacitor energy can be dissipated for all flux and torque commands which produce positive power flow.

The load 32 can be monitored to facilitate controlling the positive power flow so that limited torque is produced for moving the vehicle. In particular, motor speed can be monitored to determine the torque level which would cause the vehicle to move.

If the load 32 is a vehicle, the torque command and flux command are preferably selected such that the motor 28 produces zero torque or insufficient torque to move the vehicle. This can be done for all flux commands if the torque command is zero or sufficiently small to prevent movement of the vehicle.

Figure 2:
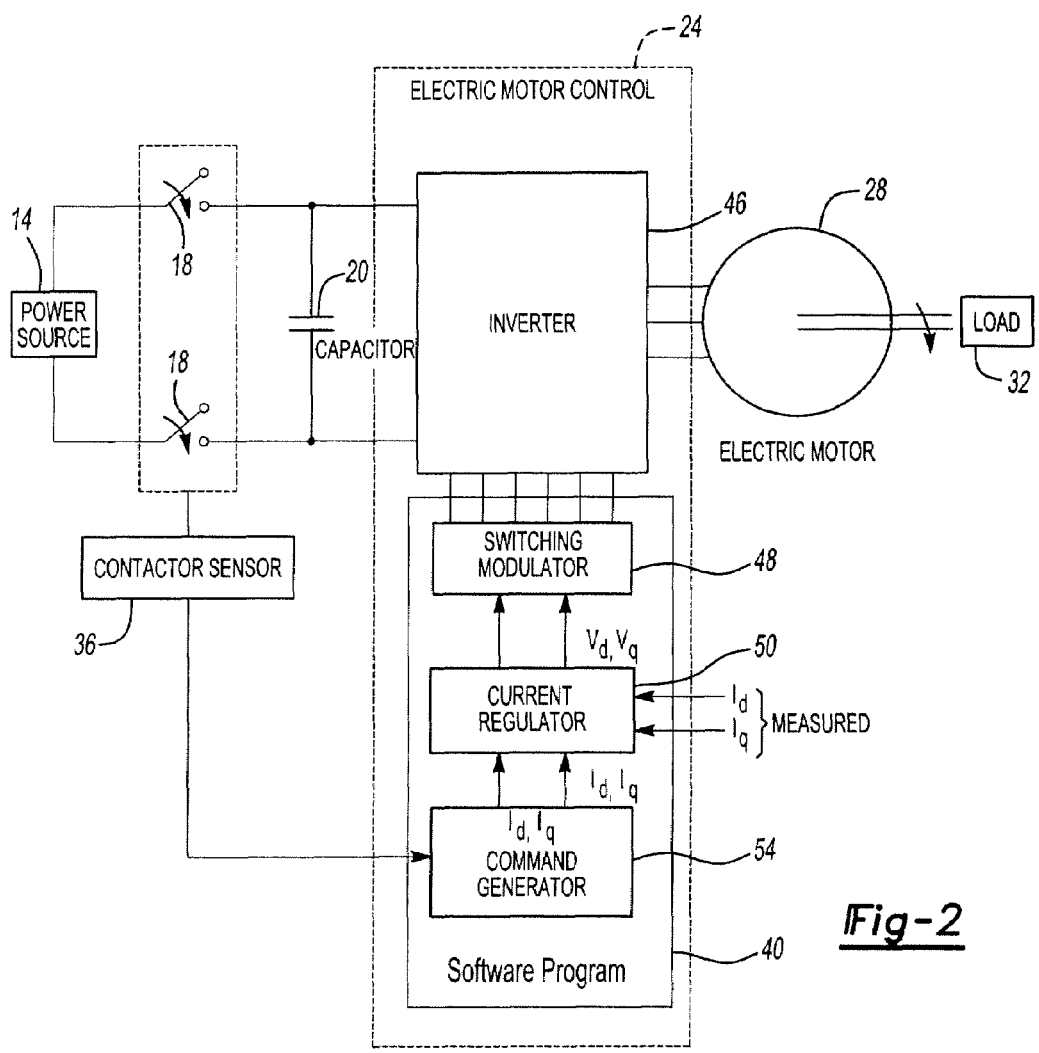
FIG. 2 illustrates an electric motor controller for use with an electric drive system to discharge the stored capacitor energy.

FIG. 2 illustrates the operation of the electric motor controller 24 in more detail and with respect to an optional synchronously rotating d-q reference frame motor torque and flux control methodology. The d-q reference frame methodology generally relates to a simplified approach for controlling the electric motor 28. Rather than controlling the electric motor 28 according to the flux and torque commands shown in FIG. 1, the electric motor controller shown in FIG. 2 controls the electric motor 28 according to the d-q reference frame methodology.

The d-q methodology utilizes a quadrature-axis current value (Iq) and a direct-axis current value (Id). The Iq and Id values are controlled by the voltage provided to the electric motor 28. By controlling the voltage provided to the electric motor 28, the torque and flux produced by the electric motor are controlled.

The electric motor controller 24 includes an inverter 46, a switching modulator 48, a current regulator 50, and a command generator 54. In addition, the electronic motor controller includes inputs for receiving a signal from the contactor sensor 36, a measured Iq value, and a measured Id value.

The switching modulator 48, current regulator 50, and command generator 54 are functional aspects of the software programs 40 and are used to control the inverter 46. The software program 40 is maintained on a computer-readable portion of the electric motor control and comprises a number of computer-executable instructions. A microprocessor can be included to execute the software program.

The command generator 54 calculates the Iq and Id values such that the stored capacitor energy is transferred from the capacitor 20 to the inverter 46 and the electric motor 28. The inverter 46 and the electric motor 28 dissipate the received energy. In this manner, current is drawn from the capacitor 20 and the capacitor 20 is discharged.

Current is drawn from the capacitor 20 for all Iq and Id values which produce positive power flow from the capacitor 20 to the inverter 46 and preferably on through to the electric motor 28. However, the combination of Iq and Id values must be selected in light of their effect on motor torque and motor flux.

The Iq and Id values are calculated based up the characteristics of the electric motor. To demonstrate for exemplary purposes the manner in which the Iq and Id values can be calculated, the following equation, which corresponds with an interior permanent magnet synchronous motor, is provided.

$$T = (3/2) * p * Iq * [phi + (Ld - Lq) * Id] \quad (1)$$

wherein:

T=torque;

p=number of stator pole-pairs;

phi=Flux-linkages (weber-turns) due to the permanent magnets;

Ld=Self-inductance of the stator along d-axis;

Lq=Self-inductance of the stator along q-axis;

Id=Motor stator current along d-axis; and

Iq=Motor stator current along q-axis.

Typically, the Iq and Id values used to discharge the stored capacitor energy are calculated such that the torque produced by the motor 28 is insufficient to move the load 32 connected to the motor 28. For example, if the load is a vehicle driven by the motor 28, then Iq and Id values would be calculated which correspond with a sufficiently low torque value so that the torque is unable to move the vehicle.

Initially, the Iq and Id values are received by the current regulator 50. The current regulator 50 is a feedback system which receives the measured Iq and Id values. The calculated Iq and Id values represent target values, whereas the measured Iq and Id values represent real values. The comparison is done so that modifications can be made to the voltage provided to the electric motor 28 if the measured Iq and Id values are not matching the calculated Iq and Id values.

Based on the comparison of Iq and Id values the current regulator 50 outputs a quadrature-axis voltage (Vq) and a direct-axis voltage (Vd). The Vq and Vd values are received by the switching modulator 48 for use in controlling the inverter.

The switching modulator 48 outputs a number of switching signals based on the Vq and Vd values. The switching signals then control the inverter 46 and the inverter's DC to AC voltage conversion.

The software program 40 manipulates the Iq and Id values as needed to control the torque and flux values and the Iq and Id values in turn determine the voltage provided to the electric motor. The manner in which the voltage is provided to the electric motor 28 controls the amount of energy dissipated from the capacitor 20.

The present invention discharges the capacitor 20 through the electric motor 28 without the need for additional system components. This leads to system cost savings. Moreover, control logic can be provided for the system 10 which is applicable to different variations of the system 10. This reduces the costs to reconfigure hardware systems.

While the best mode for carrying out the invention has been described in detail, those familiar with the art to which this invention relates will recognize various alternative designs and embodiments for practicing the invention as defined by the following claims.

What is claimed:

1. A method to discharge a capacitor in an automotive electric drive system of an electric vehicle, wherein the electric drive system includes an electric power source coupled by contactors to the capacitor for providing power to an electric motor coupled to a pair of wheels used to drive the vehicle, the method comprising:

determining a disconnect of the contactors; and discharging the capacitor in response to the disconnect by controllably transferring energy directly from the capacitor to the electric motor without turning the wheels used to drive the vehicle.

2. The method of claim 1 wherein discharging the capacitor includes controlling a quadrature-axis current value and a direct-axis current value of the energy discharged from the capacitor to the motor such that the energy discharged from the capacitor to the electric motor powers the electric motor without driving the wheels.

3. The method of claim 2 wherein discharging the capacitor comprises calculating the quadrature-axis current value and the direct-axis current value such that the quadrature-axis current value is sufficiently small to produce insufficient torque to drive the wheels.

4. The method of claim 2 wherein discharging the capacitor comprises calculating the quadrature-axis current value and the direct-axis current value such that the quadrature-axis current value is zero and no torque is produced by the electric motor for any direct-axis current value.

5. The method of claim 2 wherein calculating the quadrature-axis current value and the direct-axis current value comprises calculating values to produce positive power flow from the capacitor to the electric motor which provides insufficient torque for turning the wheels.

6. A method of discharging a capacitor electrically connected between a power source and an electric motor used to drive an automobile, the method comprising:

determining a need to discharge the capacitor; and controllably transferring stored capacitor energy to the electric motor in response to determining the need, wherein the electric motor consumes the transferred energy without driving the automobile.

7. The method of claim 6 further comprising transferring the energy such that the electric motor applies torque to a drive device used to turn wheels associated with driving the vehicle.

8. The method of claim 7 further comprising limiting the applied torque to torque values less than a driving torque value, the driving torque value associated with applied toque sufficient for driving the vehicle.

9. The method of claim 6 further comprising discharging all the energy of the capacitor to the electric motor.

10. The method of claim 6 wherein discharging the capacitor includes controlling a quadrature-axis current value and a direct-axis current value of the energy discharged from the capacitor to the motor.

11. The method of claim 10 wherein discharging the capacitor comprises calculating the quadrature-axis current value and the direct-axis current value such that the quadrature-axis current value is sufficiently small to produce insufficient torque to drive the automobile.

12. The method of claim 10 wherein discharging the capacitor comprises calculating the quadrature-axis current value and the direct-axis current value such that the quadrature-axis current value is zero and no torque is produced by the electric motor for any direct-axis current value.

13. The method of claim 10 wherein calculating the quadrature-axis current value and the direct-axis current value comprises calculating values to produce positive power flow from the capacitor to the electric motor which provides insufficient torque for driving the automobile.

14. The method of claim 10 further comprising transferring energy to the electric motor only if the electric motor is not needed for driving the vehicle.

15. A drive system for a vehicle, the drive system comprising:

an electric motor for driving the vehicle;

a battery for powering the electric motor;

a capacitor electrically connected between the battery and the electric motor; and a controller for discharging the capacitor when the electric motor is not needed for driving the vehicle, the controller discharging the capacitor by transferring energy from the capacitor to the electric motor wherein the electric motor consumes the stored capacitor energy without driving the vehicle.

16. The system of claim 14 wherein the capacitor is only able to discharge energy to the electric motor.

17. The system of claim 14 further comprising contactors connected between the battery and the capacitor such that the capacitor is only able to discharge energy to the electric motor when the contactors are open.

18. The system of claim 17 wherein the controller determines the electric motor is not needed for driving the vehicle only if the contactors are opened.

19. The system of claim 18 further comprising a sensor for sensing opening of the contactors, the controller determining contactor opening as a function of signals received from the sensor.

20. The system of claim 15 wherein the controller controls a quadrature-axis current value and a direct-axis current value for energy discharged from the capacitor to the motor.

* * * * *